US008010894B2

(12) United States Patent
Merrill et al.

(10) Patent No.: US 8,010,894 B2
(45) Date of Patent: Aug. 30, 2011

(54) MEMORY OPTIMIZING FOR RE-ORDERING USER EDITS

(75) Inventors: John Wickens Lamb Merrill, Redmond, WA (US); Mark Lino Nielson, Snohomish, WA (US); Rupali Jain, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 823 days.

(21) Appl. No.: 11/131,960

(22) Filed: May 18, 2005

(65) Prior Publication Data

US 2006/0265639 A1 Nov. 23, 2006

(51) Int. Cl.
*G06F 17/00* (2006.01)

(52) U.S. Cl. ........................................ 715/255; 715/229

(58) Field of Classification Search .................. 715/255, 715/229, 230
See application file for complete search history.

(56) References Cited

U.S. PATENT DOCUMENTS

| | | | | |
|---|---|---|---|---|
| 5,043,891 A * | 8/1991 | Goldstein et al. | ............... | 715/234 |
| 5,553,216 A * | 9/1996 | Yoshioka et al. | ............... | 715/210 |
| 5,694,610 A * | 12/1997 | Habib et al. | ................... | 715/210 |
| 5,734,899 A * | 3/1998 | Yoshizawa et al. | ........... | 707/203 |
| 5,819,295 A * | 10/1998 | Nakagawa et al. | ................... | 1/1 |
| 6,043,823 A * | 3/2000 | Kodaira et al. | ............... | 345/619 |
| 6,061,697 A * | 5/2000 | Nakao | ............................. | 715/229 |
| 6,067,565 A * | 5/2000 | Horvitz | .......................... | 709/218 |
| 6,574,674 B1 * | 6/2003 | May et al. | ..................... | 719/310 |
| 6,928,425 B2 * | 8/2005 | Grefenstette et al. | ......... | 715/209 |
| 6,950,987 B1 * | 9/2005 | Hargraves et al. | ............ | 715/207 |
| 7,010,752 B2 * | 3/2006 | Ly | ................................. | 715/769 |
| 7,134,071 B2 * | 11/2006 | Ohwada et al. | ............... | 715/229 |
| 7,165,215 B2 * | 1/2007 | Tunning | ........................ | 715/234 |
| 7,171,618 B2 * | 1/2007 | Harrington et al. | ........... | 715/229 |
| 7,188,312 B2 * | 3/2007 | Hsiu-Ping et al. | ............ | 715/249 |
| 7,228,496 B2 * | 6/2007 | Hamada | ........................ | 715/255 |
| 7,249,314 B2 * | 7/2007 | Walker et al. | .................. | 715/205 |
| 7,257,769 B2 * | 8/2007 | Caspi | ............................. | 715/233 |
| 7,340,465 B2 * | 3/2008 | Levy | ....................................... | 1/1 |
| 7,415,475 B2 * | 8/2008 | Zellweger et al. | .................... | 1/1 |
| 7,437,709 B2 * | 10/2008 | Salter | ............................ | 717/112 |
| 7,783,972 B2 * | 8/2010 | Camps et al. | ................. | 715/255 |
| 2001/0044813 A1 * | 11/2001 | Frank | ............................ | 707/530 |
| 2002/0023113 A1 * | 2/2002 | Hsing et al. | .................... | 707/513 |
| 2002/0054044 A1 * | 5/2002 | Lu et al. | ........................ | 345/536 |

(Continued)

OTHER PUBLICATIONS

Gregory Cobena, 'Detecting Changes in XML Documents' Processings of the 18th International Conference on Data Engineering, Published 2002, pp. 1-12.*

*Primary Examiner* — Doug Hutton
*Assistant Examiner* — Benjamin Smith
(74) *Attorney, Agent, or Firm* — Woodcock Washburn LLP

(57) ABSTRACT

The subject invention can track and apply user edits to a source document as a sequence of changes. The changes can be applied in a document or spatial order irrespective of temporal factors. The invention can maintain intervals that represent user operations (e.g., insertions, deletions, zero-net-length changes). As well, the invention can infer a location in the original document that corresponds to a particular operation. In accordance therewith, the invention can arrange temporally sequenced user document modifications into an order consistent with the layout of the document file encoding. This functionality of mapping re-sequenced changes into the original document data representation is one novel feature of the invention. The invention can enable portions of the source document loaded into memory on an as-needed basis whereby changes relevant to the instant portion can be made.

17 Claims, 12 Drawing Sheets

U.S. PATENT DOCUMENTS

| | | | |
|---|---|---|---|
| 2002/0065848 A1* | 5/2002 | Walker et al. | 707/511 |
| 2002/0095444 A1* | 7/2002 | Mantaro | 707/515 |
| 2003/0074352 A1* | 4/2003 | Raboczi et al. | 707/4 |
| 2003/0120999 A1* | 6/2003 | Miller et al. | 715/503 |
| 2003/0206203 A1* | 11/2003 | Ly | 345/853 |
| 2004/0039731 A1* | 2/2004 | Levy | 707/3 |
| 2004/0107173 A1* | 6/2004 | Cheng | 706/54 |
| 2004/0109024 A1* | 6/2004 | Hori et al. | 345/762 |
| 2004/0199550 A1* | 10/2004 | Ito et al. | 707/201 |
| 2004/0201633 A1* | 10/2004 | Barsness et al. | 345/864 |
| 2005/0071755 A1* | 3/2005 | Harrington et al. | 715/511 |
| 2005/0223325 A1* | 10/2005 | Naitou | 715/530 |
| 2006/0041686 A1* | 2/2006 | Caspi et al. | 709/248 |
| 2006/0259853 A1* | 11/2006 | Zellweger et al. | 715/500.1 |
| 2007/0186157 A1* | 8/2007 | Walker et al. | 715/530 |
| 2007/0271509 A1* | 11/2007 | Abernethy et al. | 715/531 |
| 2007/0282693 A1* | 12/2007 | Staib et al. | 705/26 |
| 2008/0222516 A1* | 9/2008 | Petri | 715/236 |
| 2009/0113293 A1* | 4/2009 | Schubert | 715/256 |

* cited by examiner

MEMORY OPTIMIZING FOR RE-ORDERING USER EDITS

TECHNICAL FIELD

This invention is related to computer systems and more particularly to mechanisms and techniques that map re-sequenced changes into an original document data representation.

BACKGROUND OF THE INVENTION

In order to preserve document features that an editor cannot represent, it can be advantageous to apply user edits to the source document as a sequence of changes, rather than writing out the document from the data representations of the editor used. Conventional editors employ the latter method. Following this approach can require that the entire source document load into memory. As well, this approach can require arbitrary portions of the document to load at arbitrary times.

A rich edit window is a design surface that is primarily used with RTF (rich text format) files. A rich editor can also provide a means that a user can programmatically insert text, format text as well as to incorporate other features into a document. One application is to employ rich edit to display word processing (e.g., Word) documents. Word processing documents are frequently in a much richer format than a rich editor can support. However, a user does not want to lose all of the rich formatting available in the word processing document after the document is brought into the rich editor, edited and saved.

As described above, traditional approaches require that the entire document be put in memory whereby the changes can be applied sequentially as generated. These systems unnecessarily consume available memory which can be limited resource in today's handheld devices (e.g., smartphone, personal data assistant (PDA), Pocket PC, . . . ). Moreover, these traditional implementations can possibly require iterative accesses to the same portion of the source document thereby degrading overall document system performance.

What is needed is a system and methodology that arranges temporally sequenced user document modifications into an order consistent with the layout of the document file encoding. This type of system can improve the document save performance and decrease the memory accesses required thus, preserving the valuable memory resource.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

When displaying a document on a device having limited memory and limited display capabilities, it is often the case that the displayed version of the document does not match the actual document. In order to preserve document features that an editor cannot represent, the subject invention, in one aspect thereof, can track and apply user edits to a source document as a sequence of changes, rather than writing out the document from the data representations of the editor used. It is a novel feature of the invention to maintain intervals that represent user operations (e.g., insertions, deletions, zero-net-length changes) and to infer exactly where in the original document a change would correspond. Accordingly, these interval representations can be applied to the original thereby effecting user operations in a document order.

Following this approach can enable "as-needed" portions of the source document to be loaded into memory whereby changes relevant to the instant portion can be made. This system can be particularly useful when editing very large documents as well as when employing a device with limited memory capacity.

This invention can be an efficient mechanism for transforming a random change list into a change list in specified document order. In one aspect, operations can be classified into one of three categories: insertions, deletions, or zero-net-length (e.g., zero-net-length) changes. The changes can be applied incrementally against a virtual file space rather than against the actual document. One novel feature of the invention is that the intervals can be maintained to effect changes to a document. As well, based at least upon the interval, the invention can infer a location in the original document that corresponds to a change.

In another aspect, in order to preserve document features that an editor cannot represent, the invention can arrange temporally sequenced user document modifications into an order consistent with the layout of the document file encoding. This method can improve the document save performance and decrease the memory accesses required to modify a document. This functionality of mapping re-sequenced changes into the original document data representation is one novel feature of the invention.

In yet another aspect, the invention can include three separate levels that interact through defined API (application program interface) layers. These three layers can be represented by a document filter layer, an application filter layer and an editing surface layer. The document filter can read and write a document in any arbitrary format. The application filter can read a common representation of the document and format the representation for display through the editing surface. The editing surface can display the document contents whereby a user can edit those contents.

In still another aspect, the editing surface can also collect the operations (e.g., insertions, deletions, zero-net-length changes) that the user performs, in sequential order. The operations can be presented to the application filter. The application filter can merge the changes with the original document, and transmit the updated document to the document filter in order to write the file.

In yet another aspect thereof, an artificial intelligence component is provided that employs a probabilistic and/or statistical-based analysis to prognose or infer an action that a user desires to be automatically performed. Other aspects employ rules-based logic in order to pre-program preferences of a user.

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
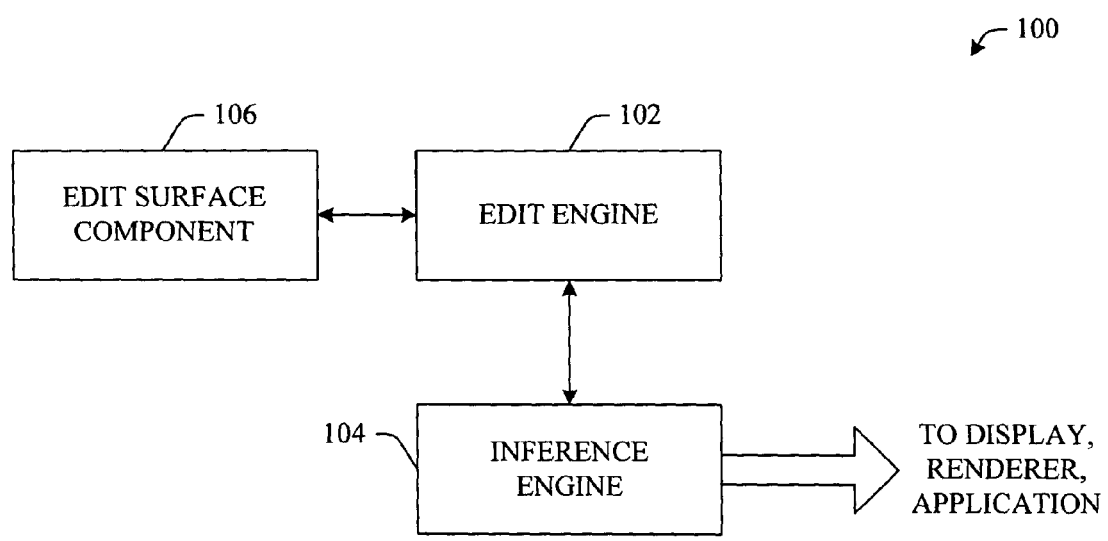
FIG. 1 illustrates a general component block diagram of a system that effects modifications from an edit surface in accordance with an aspect of the subject invention.

The invention is now described with reference to the drawings, wherein like reference numerals are used to refer to like elements throughout. In the following description, for purposes of explanation, numerous specific details are set forth in order to provide a thorough understanding of the subject invention. It may be evident, however, that the invention can be practiced without these specific details. In other instances, well-known structures and devices are shown in block diagram form in order to facilitate describing the invention.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The subject invention can employ any text editor to track changes and/or modifications a user makes to a document as a series of events. For example, suppose a user modifies a document to insert, delete or format a quantity of text, these changes can be stored as a changed event. Accordingly, the position in the document where the change is made can be stored along with the actual change itself. It will be appreciated that this position can be the position on the rich edit surface and not necessarily the position in the rich document itself. In accordance with the invention, these two positions can be the same or different depending on disparate applications. It will be understood that because a text editor may not show headers, footers, annotations, etc., the change may be in a different place on the rich edit canvas than in the original document.

Referring initially to FIG. 1, a system 100 that facilitates tracking and applying user edits to a rich text document in accordance with an aspect is shown. Generally, system 100 can include an edit engine 102 and an inference engine 104. As illustrated the system can further include an edit surface component 106 whereby the edit engine 102 and the inference engine 104 can be employed to track and facilitate rendering a document edited in accordance with the edit surface component 106.

More particularly, the edit engine 102 can track changes in sequential order. In other words, the edit engine 102 can track modifications made on the edit surface component 106 at the time that the edits were made. Therefore, this tracking can be temporal with regard to the time the changes were made. Accordingly, every change can dynamically affect the document structure at that respective point in time.

The edit engine 102 together with the inference engine 104 can generate an interval representative of each modification. Additionally, the system 100 can build upon each interval whereby each subsequent change can be represented as a compilation of the subsequent change together with previous changes. This novel mechanism of tracking changes can be employed to streamline tracking and application of user edits in a rich text editor environment.

As described supra, conventionally, edits were applied to a document in the order that the user made the changes. However, the subject invention does not apply changes temporally. Rather, the subject invention tracks changes temporally in accordance with an interval mechanism and applies the changes in a document or spatial order irrespective of temporal factors. In other words, suppose a first change occurred at the last character of a document. Conventional systems would be required to load the entire file into memory in order to make that change to the last character. As well, it would be necessary to have the presentation in memory to show the state of the file following the change. Of course, the need to have the entire document in memory as documents can get rather large can greatly reduce efficiency and memory allocation.

The subject invention can represent edits and/or modifications in a tree-like manner. Accordingly, managing a tree-like structure in memory can be particularly less expensive on the device than loading the entire document into memory.

Figure 2:
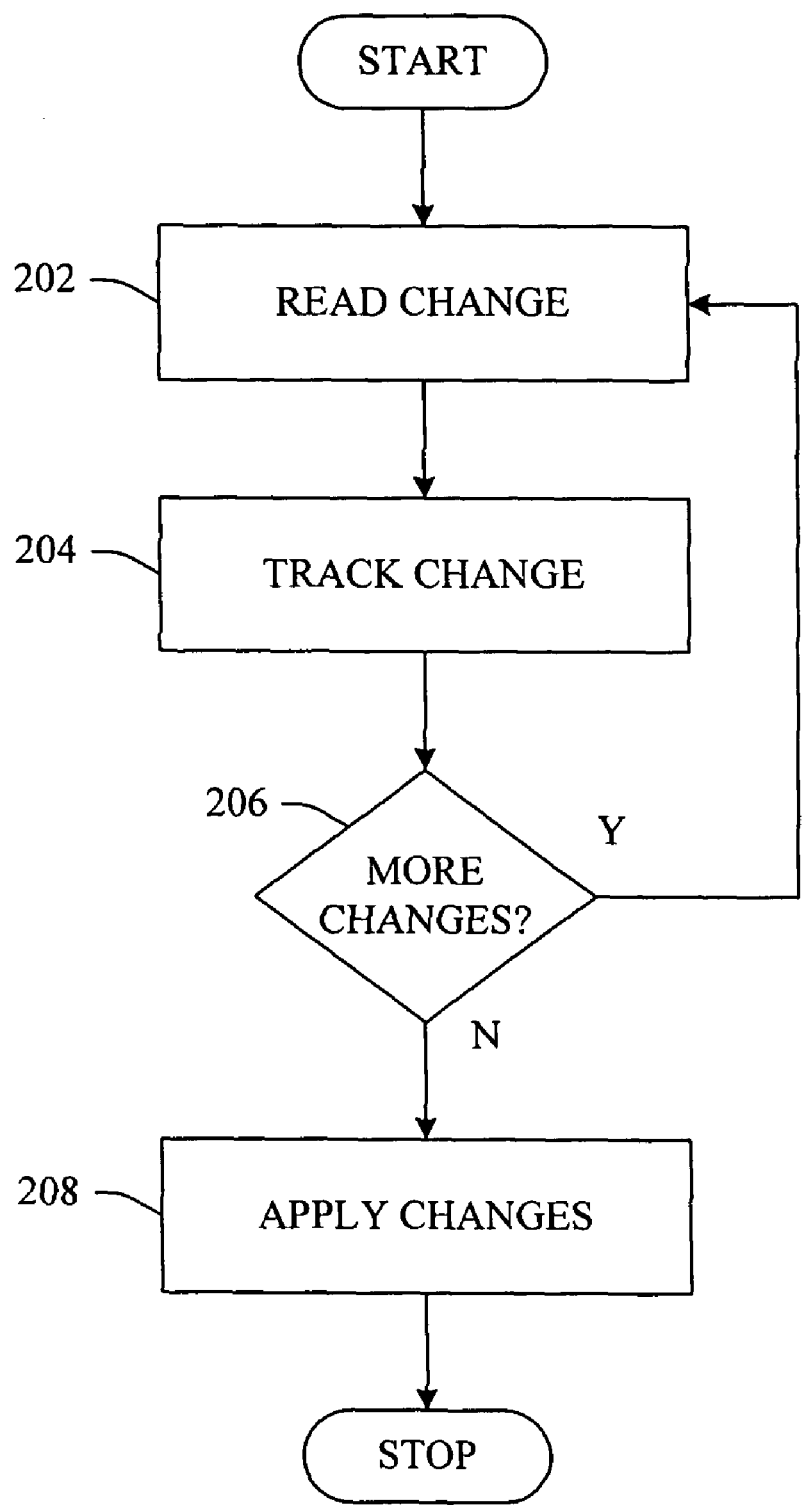
FIG. 2 illustrates an exemplary flow chart of procedures to track and apply changes in accordance with a disclosed aspect.

FIG. 2 illustrates a methodology of tracking changes in accordance with the invention. While, for purposes of simplicity of explanation, the one or more methodologies shown herein, e.g., in the form of a flow chart, are shown and described as a series of acts, it is to be understood and appreciated that the subject invention is not limited by the order of acts, as some acts may, in accordance with the invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the invention.

At 202, an initial change is read. As described, this change can be any one of an insertion, deletion or zero-net-length (e.g., formatting) change. The change can be applied via any text editor with reference to any type of document. For example, the change (e.g., revision, modification) can be applied to a word processor document using a rich text editor. As well, the change can be applied to a spreadsheet or database without departing from the novel functionality described herein.

At 204, the change can be tracked. As will be understood from the discussion that follows, changes can be tracked in any manner consistent with novelty of the invention. For example, a tree-like structure of intervals can be employed that compile, build upon and/or organize changes based at least in part on modification type (e.g., insertion, deletion, zero-net-length change). In one aspect, the invention can track intervals of changes whereas the most current interval can be a representation of all changes to a document.

At 206, a determination can be made if additional changes are desired. If additional changes are applicable, the system can return to 202 and read the next change. On the other hand, if an additional change is not applicable, the system can apply the changes at 208. It will be appreciated upon the discussion that follows that the changes can be applied in accordance with the most current compilation of changes. For example, the system can compile all changes that correspond to a determined segment of the document. Accordingly, the system can apply the changes with respect to each defined segment. Therefore, the system can apply the changes such that the entire document will not have to be in memory at any one time. Once the changes are applied, a stop block is reached.

Figure 3:
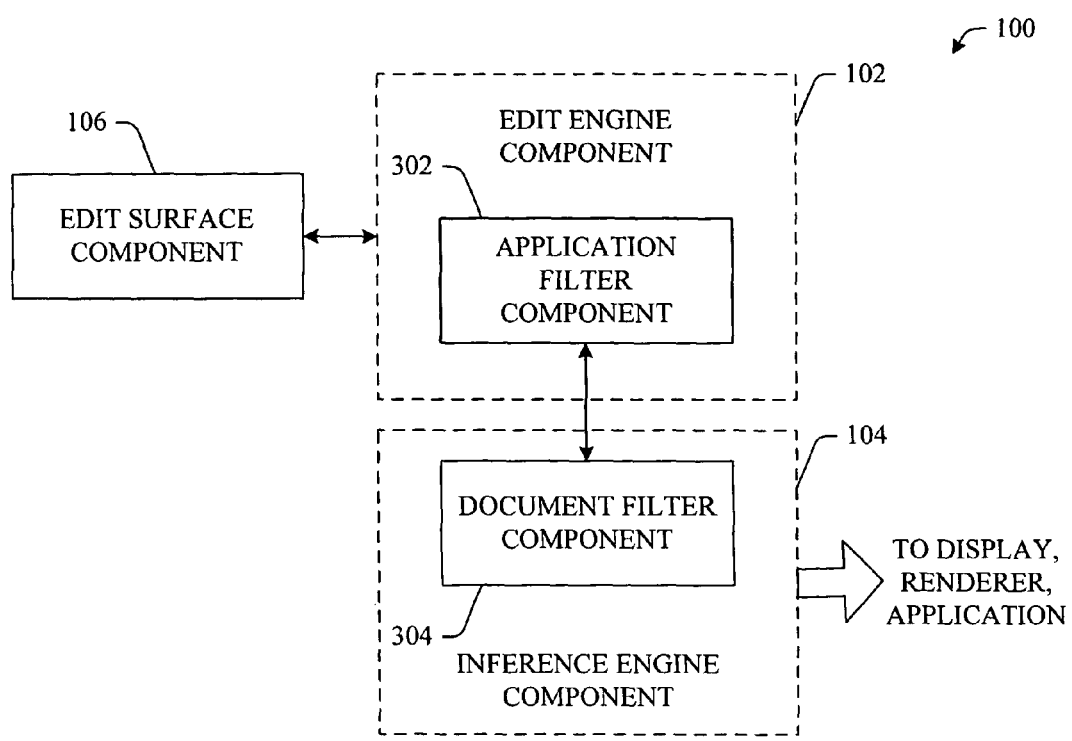
FIG. 3 illustrates a general component block diagram of a system having a document filter and an application filter in accordance with an aspect of the subject invention.

Turning now to FIG. 3, an alternative schematic view of system 100 is shown. As described with reference to FIG. 1, system 100 can include an edit engine 102 and an inference engine 104. As illustrated, edit engine 102 can include an application filter component 302 and inference engine 104 can include a document filter component 304.

With reference to FIG. 3, suppose a user who has a data source however, does not know anything about the particular source. In other words, the data source is not present on a particular device, is not available on the device, and would not even run on the device even if desired. However, the source can produce data files with information.

The subject invention provides a mechanism for representing these proprietary data files in a need-to-process fashion. Because these data files can be difficult to process, a document filter 302 can be applied to process these files. The document filter 302 can take a large file and generate an individual stream of data. In one example, the document filter 302 can generate a stream of XML (extensible markup language). This novel stream conversion can alleviate memory allocation on a device by regulating necessary data into memory on an as-needed basis.

Even though the rich editing surface 106 may not be capable of processing an entire document, a document filter 302 can be capable of comprehending the entire document and producing it into an intermediate format which is can be transferred to the application filter 304. The application filter 304 can construct a binary representation of the data. As well, the application filter 304 can opt to ignore portions of data based on modification criteria. Effectively, the aforementioned tree-like interval representation of changes and/or modifications can be retained within in the application filter 304.

As illustrated, the document filter 302 can effect the means for rendering (e.g., displaying) the document. Reproduction of the original document format is one reason that the document filter 302 is capable to understand everything about the document. All in all, in one aspect, it is the document filter 302 that produces the rich representation of the document. The application filter 304 has the option of picking and choosing portions of the document. The application filter 304 can employ the portions (e.g., segments, intervals, streams) of the document to create an interval tree. Accordingly, the application filter 304 can push up to the editing surface 106 those parts that are relevant to the application at hand.

In operation, bi-directional communication exists between the document filter 302 and the application filter 304. For example, when changes are made on the editing surface 106, the changes can be transferred to the application filter 304. The application filter 304 can be employed to spatially order the revisions and/or changes. The document filter 302 can be invoked and the relevant contents of the document can be identified and streamed up to the application filter 304. Tracking of changes can be applied at the application filter 304 level to merge into the spatially ordered changes that have occurred. These changes can be sent back to the document filter 302 as a stream. In accordance therewith, the document filter 302 can render (e.g., display) the changes in any format, regardless of any arcane nature of the original format of the document.

Figure 4:
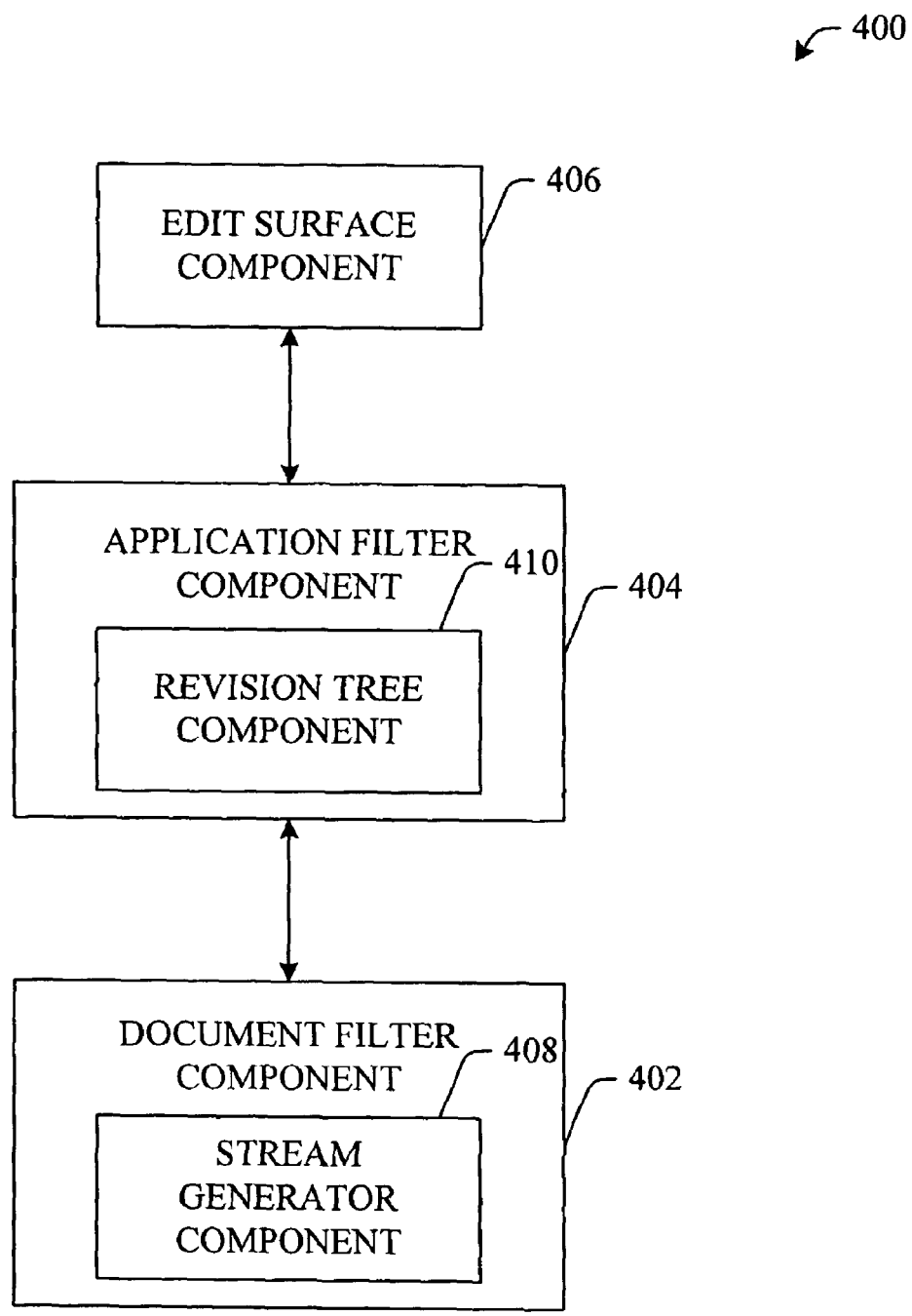
FIG. 4 illustrates a general component block diagram of a system having a revision tree component and a stream generator component in accordance with an aspect of the subject invention.

In accordance with the invention, it is to be understood that the document filter 302 can take any static file, regardless of an arcane format, and can produce a stream to be input into the application filter 304. The document filter 302 can also accept a stream from the application filter 304 and produce (e.g., effect rendering of) a new or modified file. A novel aspect of the invention is that it is possible to touch a particular spatial portion of a document only once when modifying and/or updating a document. In other words, a spatial portion of the document is input into the application filter 304 level once, it goes into the application filter 304 only once and generates a stream. Therefore, it should not be necessary to touch that portion again. It will be appreciated that this mechanism can be both efficient and fast Turning now to FIG. 4, a system 400 that facilitates applying text edits to a document is shown. Generally, system 400 can include a document filter 402 and an application filter 404. The document filter 402 and application filter 404 can have the same or similar functionality with reference to editor surface component 406 as previously described with reference to FIGS. 1 and 3. As illustrated in FIG. 4, document filter 402 can include a stream generator component 408. Application filter 404 can include a revision tree component 410.

Effectively, the subject invention can be employed to display a portion of a document, apply changes to that portion of the document and then move from that point forward applying changes. In other words, the invention can apply a window in the document, apply text edits to that window and move forward throughout the document displaying additional window portions. Contrary to traditional systems that received changes from the edit surface and cued them up temporally in any random spatial location, the subject invention can apply changes spatially in a sequential spatial order independent of their temporal occurrence. This sequential spatial order can be effected via stream generator component 408 and revision tree component 410.

The invention can be particularly useful when employed in connection with handheld and portable devices with limited memory. As described supra, the invention can be used with any type of file edited by a text editor. By way of example, the invention can be used with a word processor, spreadsheet, database or the like. Essentially, the invention can be use with any kind of data that can be exposed via a rich editing surface. A novel feature of the invention is that the invention can take richly structured data, permit editing via the impoverished surface and then reconstitute the original richly formatted data.

Figure 5:
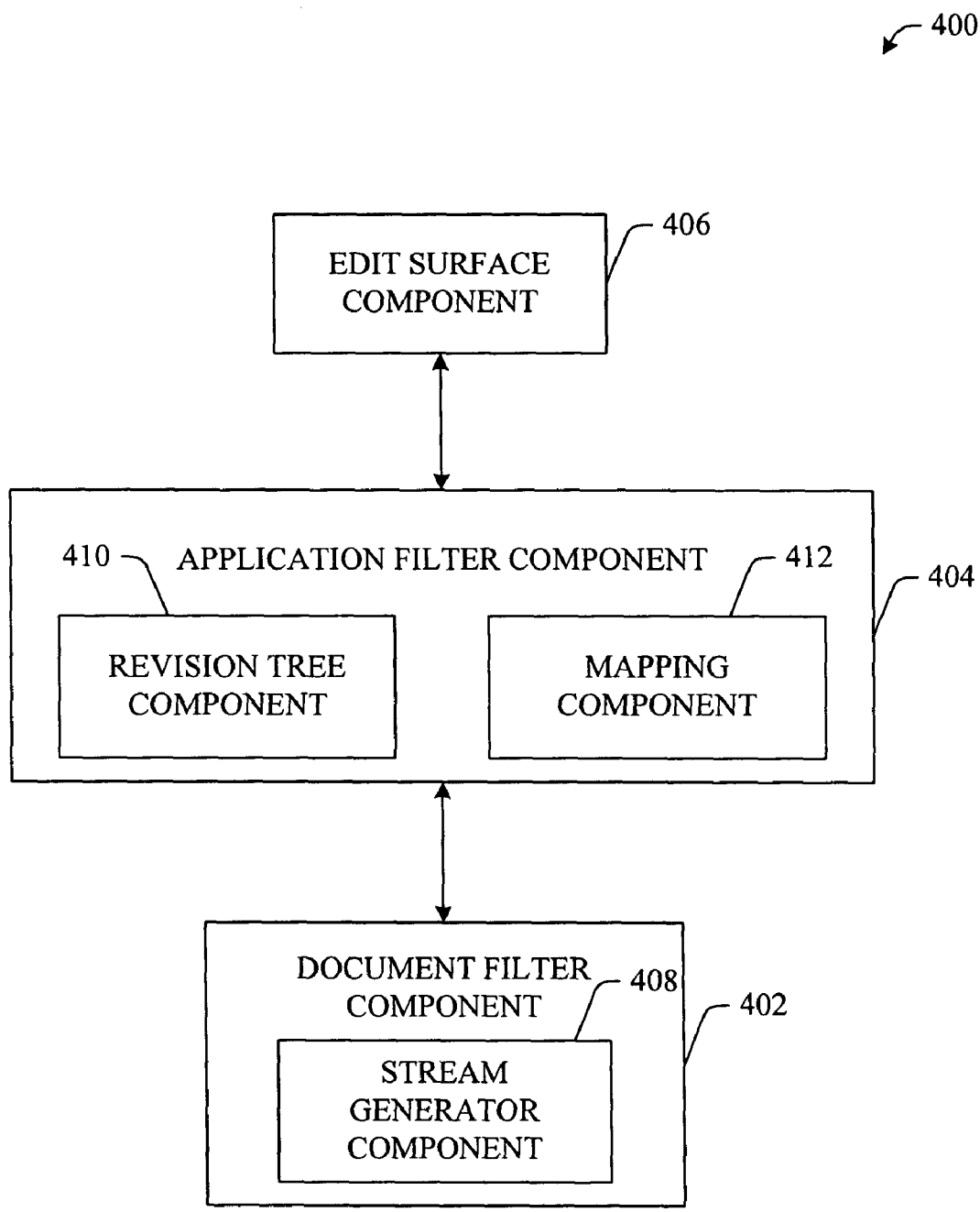
FIG. 5 illustrates a general component block diagram of a system having an application filter component that includes a mapping component in accordance with an aspect of the subject invention.

Referring now to FIG. 5, an alternative schematic representation of system 400 is shown. As described supra, system 400 can include a document filter component 402 and an application filter component 404. The implementation can consist of three separate levels (e.g., document filter 402, application filter 404 and edit surface 406) that interact through defined API layers. The document filter 402 can read and write a document in an arbitrary format. The application filter 404 can read a common representation of the document and format the document for display through the edit surface 406. The edit surface 406 can display the document contents and permit the user to edit those contents. The edit surface 406 can also employ a tracking component (not shown) that collects the operations a user performs. These tracked changes can be retained in sequential order. The edit surface 406 can present the tracked changes to the application filter 404. The application filter 404 can merge those changes with the original document, and transmit the updated document to the document filter 402 in order to write the file.

In particular, application filter component 404 can include a revision tree component 410 and a mapping component 412. These components (410, 412) can effect retention of revisions and/or document modifications made via a text editor. An aspect of the interval tracking mechanisms of the subject invention can be thought of in the terms of the revision tree structure 410. In lieu of permitting revisions to operate on the real text, the invention suggests a much larger body of text and inserts gaps when creating intervals. Effectively, the invention can employ a virtual text space to track and apply document modifications.

For example, instead of deleting the buffer, the invention can effectively scratch through the particular portion of the buffer. Every time a change is made to a document, a new layer can be added to the revision tree 410. The new layer can be based at least in part on a previous or parent layer. In one example, deleted text can be marked as deleted but, not actually struck out of the buffer. As described above, the invention can employ a virtual buffer of changes. Similarly, when an insertion is made, a gap can be inserted in the virtual space and the text is shifted to permit the insertion of the new text. All in all, revisions to the text can be represented in one interval representation of the text of the document in order. It will be appreciated that zero-net-length changes (e.g., format changes) can be noted accordingly in the interval representation.

In operation, the invention can be implemented in a reverse tree manner. In other words, instead of actually keeping the document in memory, the invention can retain a copy of intervals of the document. As changes are made, a copy of each interval can be saved and can be traced back up a tree in a novel fashion to bind the place where document was modified.

In accordance with the reverse tree mechanisms, any information from the original document that is inherited from the original document can be applied to the bottom of the tree. Therefore, the invention can actually infer (e.g., via an inference engine (not shown)) from the original document, which can be a much richer formatting, what would have happened had a user modified the document in the richer environment. This inferred rendition can be applied to the document and rendered to the user.

In order to negotiate layers in the revision tree 410, every layer that represents a change can be tracked back to the previous layer to determine an effect on the original document. It will be appreciated that when the changes are applied, the document is dynamically changing. These layers will be better understood following a discussion of FIGS. 7A to 7D that follows.

Turning now to a discussion of the mapping component 412, the mapping component 412 can be employed to map between layers. Every time there is a split in intervals, there is one interval that maps to three intervals on the next layer. This mapping can be effected via the mapping component 412. The mapping component 412 can map a numerical index of every change. As well, the mapping component 412 can be employed to associate a change to a parent in the tree. Each change is mapped to its immediate parent. In order to track a change back to the parent, the invention can walk through the revision tree 410 layer by layer mapping to intervals of respective parents to get the change point on the original document.

Figure 6A:
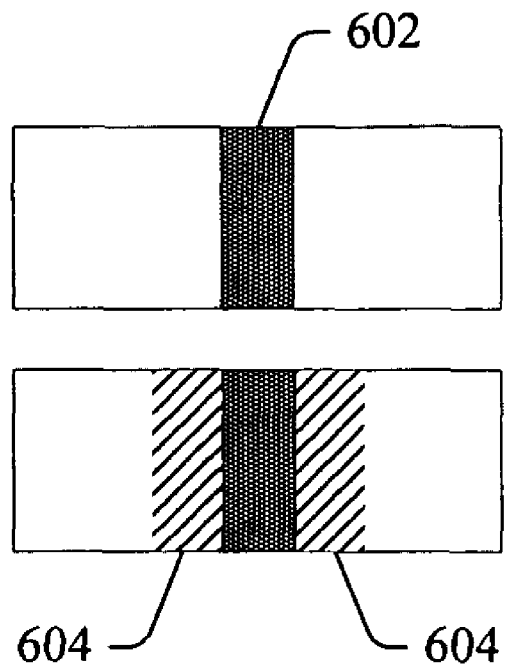
FIG. 6A is a graphical representation of a series of deletions in accordance with an aspect of the invention.
Figure 6B:
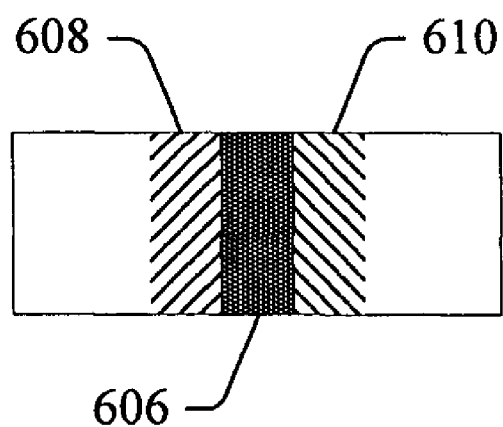
FIG. 6B is a graphical representation of two deletions depicted in document order in accordance with the invention.

FIG. 6 illustrates a schematic difference between user and document order. The process of applying changes to a document can be relatively complicated. In one aspect, if the user made changes to the document in "document order", then the document filter 402 and the application filter 404 could, at least in principle, scan through the document from first to last, applying each change as it came along. This could be quite fast, and, in addition, could consume very little memory. Unfortunately, users rarely edit documents in order. In fact, users usually make changes in an essentially random pattern, at least as far as the editing application is concerned. Applying such a scattered set of changes can require that the entire document be present in memory while the change log is "played back" against it. It will be appreciated that this would be slow and inefficient. FIGS. 6A and 6B illustrate at least one factor of motivation for the subject invention.

As illustrated in FIG. 6A, a set of two deletions performed by a user is shown. As shown, the first of these deletions is completely embedded within the second. From the user perspective, two separate contiguous blocks of text were deleted (602, 604). As far as the original document is concerned, however, the second block 604 is not contiguous as the first block 602 falls within the second block 604. The second block 604 consists of two separate portions, one before, and the other after, the segment corresponding to the first deletion 602.

FIG. 6B illustrates the same change in document order. As shown in FIG. 6B, the same two changes result in three separate segments (606, 608, 610). More particularly, the first change corresponds to 606 while the second change is split into two separate segments 608, 610 when viewed in document order.

In order to mimic the transformation described in FIG. 6A, at least directly, the entire document would have to be in memory. On the other hand, to directly mimic the change shown in FIG. 6B, the whole document would not have to be in memory, even though the net effect of the two transformations are identical. It will be appreciated that keeping the document out of memory can save a huge amount of time on most systems, since documents can be quite large. This is particularly important for use with devices with limited memory capacity.

FIGS. 7A to 7D illustrate an exemplary sequence of operations tracked in a revision tree and the pseudo-spaces that correspond to them. As described supra, the invention can employ an efficient mechanism for transforming an arbitrary change list into a change list in specified document order. This can be done by classifying all operations into one of three buckets: insertions, deletions, or zero-net-length (e.g., zero-net-length) changes, and by applying the changes incrementally against a virtual file space. It is to be appreciated that the series of changes illustrated in FIGS. 7A to 7D are not intended to limit the invention in any way. Rather, the exemplary series of intervals is provided to add context to the invention. It is to be understood that countless examples exist to represent any number of iterations and intervals related to modifying a document.

Figure 7D:
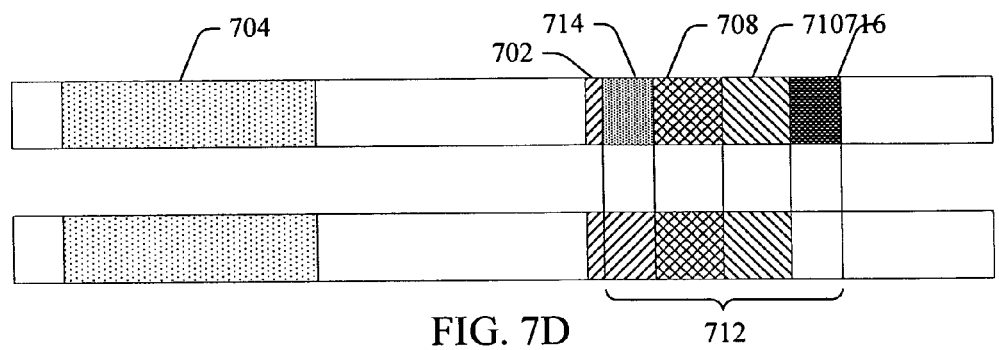
FIGS. 7A to 7D illustrate a sequence of operations tracked in a revision tree together with the pseudo-spaces that correspond to them in accordance with an aspect.
Figure 7C:
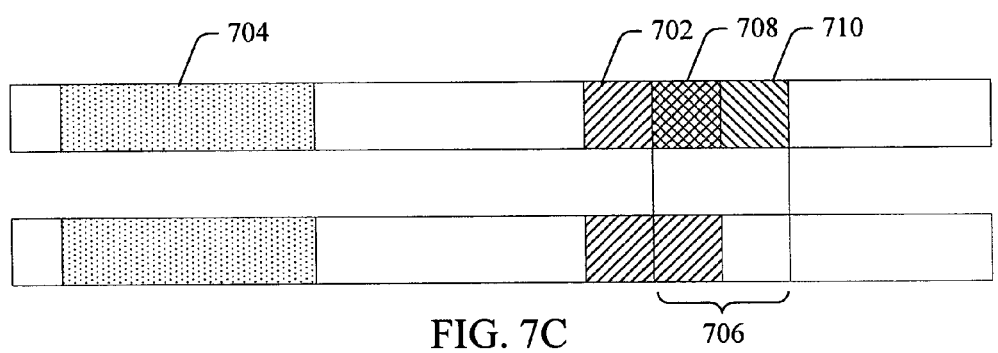
Figure 7B:
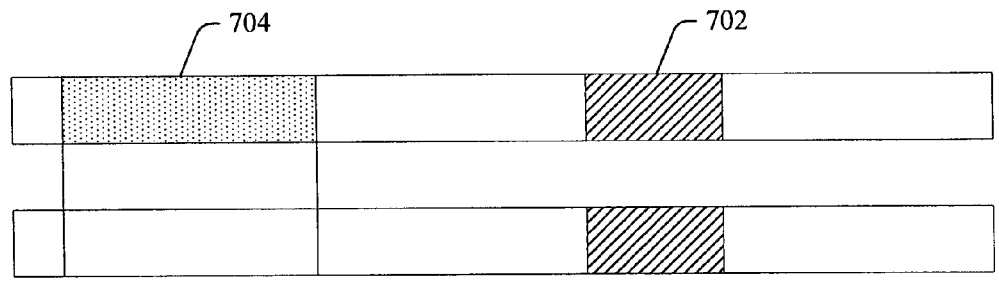
Figure 7A:
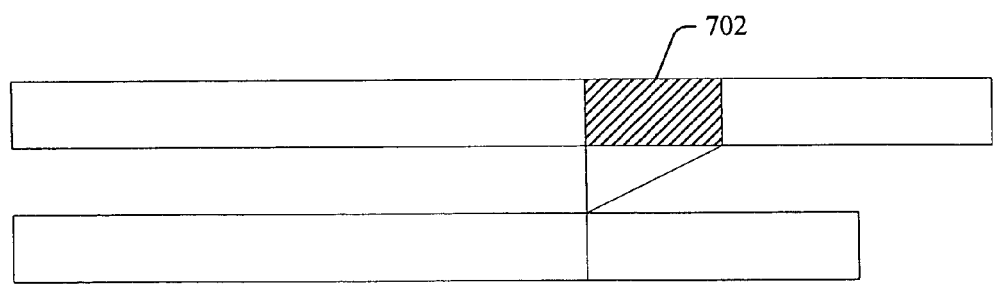

In one aspect, the process by which this happens is illustrated in FIGS. 7A to 7D. The original document can be viewed as a single interval. The first operation illustrated in FIG. 7A is an insertion 702 of text. The insertion 702 can be viewed as splitting up the original document into three intervals, the second of which is the newly inserted text. FIG. 7B illustrates a zero-net-length change 704. The structure of the document is altered in some interval, but no characters are either inserted or deleted. Zero-net-length changes, as illustrated in FIG. 7B, correspond to changes in formatting (e.g., bold text in a word processing document). Although the document does not change length, the change must still be taken into consideration. FIGS. 7C and 7D represent successive, overlapping deletions. Each of these deletions add two new pseudo-intervals to the text. These iterations will be described in greater detail infra.

Referring again to FIG. 7A, an insertion 702 is shown in layer one. The next level, FIG. 7B, illustrates no change with regard to inserting or deleting text. Rather, FIG. 7B illustrates merely a formatting or "zero-net-length" change 704. For example, the text identified by the length 704 shown can be bolded. It is to be understood that the second interval shown in FIG. 7B is built upon the first layer (e.g., parent) of FIG. 7A. This theme continues throughout the example illustrated.

Operation three shown in FIG. 7C is a deletion 706. However, it is to be understood that the deletion 706 overlaps the insertion 702 and the original text. From left to right, this overlap results in an interval having a short original initial segment, a segment marked bold 704, another unchanged segment, a short inserted segment 702 and a tail of the original document. Deleted text 708 represents inserted text that is deleted. Therefore, it is not necessary to do anything with the segment that was inserted and then deleted (e.g., 708). It will be appreciated that refraining from inserting and subsequently deleting text can enhance efficiency of the system. As well, in accordance with the deleted text 706, segment 710 will also be deleted. Again, system efficiency can be enhanced.

Continuing with the example, FIG. 7D illustrates another deletion 712. Effectively, the editor sees is a continuous deletion that includes sections 708, 710, 714 and 716. Because the text in the middle (e.g., 708, 710) has already been deleted, deletion 712 includes a portion of the original insertion 702 and a portion of the original document. Therefore, from left to right the interval can have an unchanged segment, a format changed segment 704, another unchanged segment, a short inserted segment 702, some text that was deleted from the original document 716 and then some unchanged text at the end.

In accordance with the invention, when the tail of the final buffer is reached, the invention can walk down the tree from the top of level four (e.g., FIG. 7D) to the same interval in the next layer down and so on. This portion can be mapped as a part of the previous interval. The invention can then track all the way down to the bottom of the tree to determine, it actually has unchanged formatting. Therefore, existing formatting can be retained.

It will be appreciated that this novel tree structure of tracking changes can be employed with any type of data file. For example, in the case of a word processing document or any other text document, the tree can consist of a set of linear arrays. In another example, for instance a database or a spreadsheet, the tree can consist of 2×2 or higher order table. Although these alternative file types may take a different set of operations (e.g., insert/delete column, insert/delete row, change block . . . ), the novel tree structure of tracking can be employed. In one aspect, with respect to a database, a tree can be constructed that represents an initial block of any size including as large as the table as a whole. Accordingly, the block could then be cut up to represent individual blocks which can be represented in the tree.

Following construction of the tree (e.g., FIGS. 7A to 7D), a map and a set of intervals of changes are present. Now, the changes can be applied to the original document. Effectively, the invention can walk the intervals and apply the changes of the intervals to dynamically update the document while keeping track of the mappings.

Essentially, the invention can re-read the last interval since it contains all of the changes in the document. In the example, the system can start with the small interval at the start of FIG. 7D. This interval has not changed therefore, it can be passed through without doing anything to it. Next is the zero-net-length change 704, this is a format change so the format change can be applied to the document. Since it is only a format change, it does not affect the mapping in any way. In other words, the zero-net-length change 702 does not affect original position in terms of the final position within the document.

With continued reference to FIG. 7D, the next change is a no-change interval. Therefore the change can be propagated. Next is an insertion 702. This insertion is not the complete original insertion that was performed at layer one (e.g., FIG. 7A) but rather a portion of the insert. The rest of the original insertion is marked as delete (714, 708). At this point in the changed document which maps to the original position in the original document is where the insertion 702 is applied.

The next two intervals are deleted intervals 714, 708 which maps to the inserted text of layer one. Because this portion of the insertion was merely recorded and not effected, these deletions 714, 708 represent text that actually was not added since they map to an insertion. Therefore, the system can skip this operation. It is to be understood that skipping these types of operations can enhance efficiency of the system.

The next interval 710 maps directly after the initial insertion therefore, corresponding text will be deleted from the original document. A count of the number of characters inserted as a total can be maintained thus, the system can delete that many characters from that point. In the example, the last deletion section 716 can be mapped back to the original document effecting deletion of the corresponding text. The rest of the document remains unchanged.

It is important to note how much of the stream is maintained at any one time. Although the amount of maintained text will change with respect to individual embodiments, a word processor example follows to describe this functionality. In accordance with a word processor document, the invention can effect inheritance different for different situations. With regard to lists, lists can be stored at the head of the document. This means that if a user creates a list in a document, the list can show up as a format change event. However, the change can apply spatially to a different portion of the document than where it occurred. Because this information is stored in the header, the invention can effect preprocessing of events like this and can apply the events before handling character positions.

In other words, the invention can initially apply header information and delete the information since the header information can sometimes be rather large. With regard to inheritance, there can be character formatting and paragraph formatting. Character formatting can be primarily inherited from preceding portions of the document ("from the left" in English). However, paragraph formatting can inherit from succeeding portions of the document ("from the right"), at least in some situations. For example, inheritance from the right can occur when paragraphs are merged or when a new paragraph is created. It is to be understood that the terms left and right are exemplary only. One particularly important issue is the logical order of the underlying text, not its graphical representation.

Also, if new text is generated and a carriage return applied into the text, the invention will track these changes. In this example, the amount of data needed to keep in memory would be the current paragraph, the paragraph to the left (e.g., previous) and the paragraph to the right (e.g., next) in the tree. It will be understood that it is particularly important not to run out of room on the interval to apply any change. Therefore, maintaining enough information in memory can be critical to functionality of the invention.

In one example, with regard to special markers (e.g., an annotation that spans a number of paragraphs), these markers are not shown on the document. Suppose an annotation spans three paragraphs and the second of the three paragraphs is deleted. The reference (e.g., annotation) is moved back to start of the deleted text. Therefore, it is important to maintain enough data in memory to accomplish the change. It is to be understood that one novel portion of the invention is the fact that the intervals are all that need to be maintained in memory to effect a change. Additionally, the invention can infer an exact location in the original document that corresponds to a change.

Figure 8:
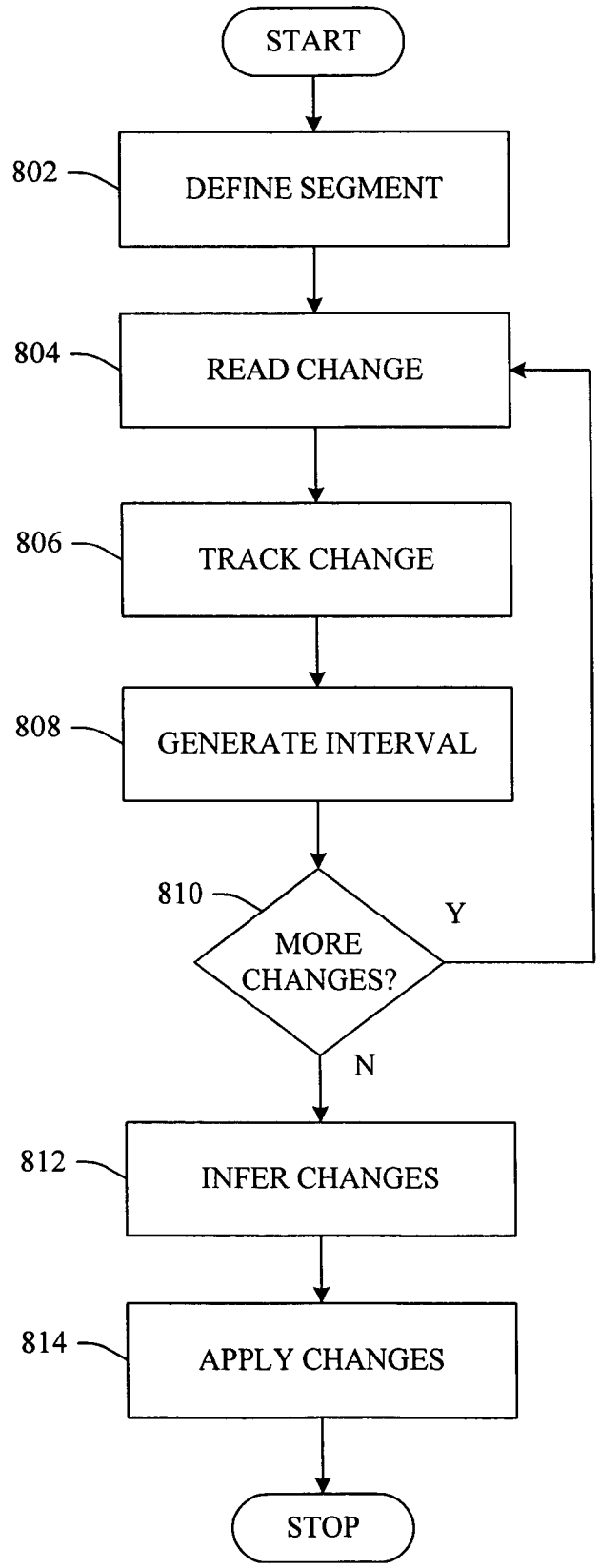
FIG. 8 illustrates an exemplary flow chart of procedures to track and apply changes to a document in accordance with a disclosed aspect.

Turning now to FIG. 8, a methodology of effecting a change is shown. At 802 a segment can be defined. For example, a segment can be a word processor run or a database table. It will be understood that a "run" in a word processor document is a string of text with no formatting change.

At 804, a change is read from an editing surface and tracked at 806. The change is incorporated into an interval layer at 808. At 810, a determination is made if additional changes exist. If additional changes exist, the methodology returns to 804 and reads the next change. Accordingly, a new interval will be generated at 808 that builds upon the preceding interval. If, at 810, no additional changes exist, they system can infer and apply the changes at 812 and 814 respectively.

Figure 9:
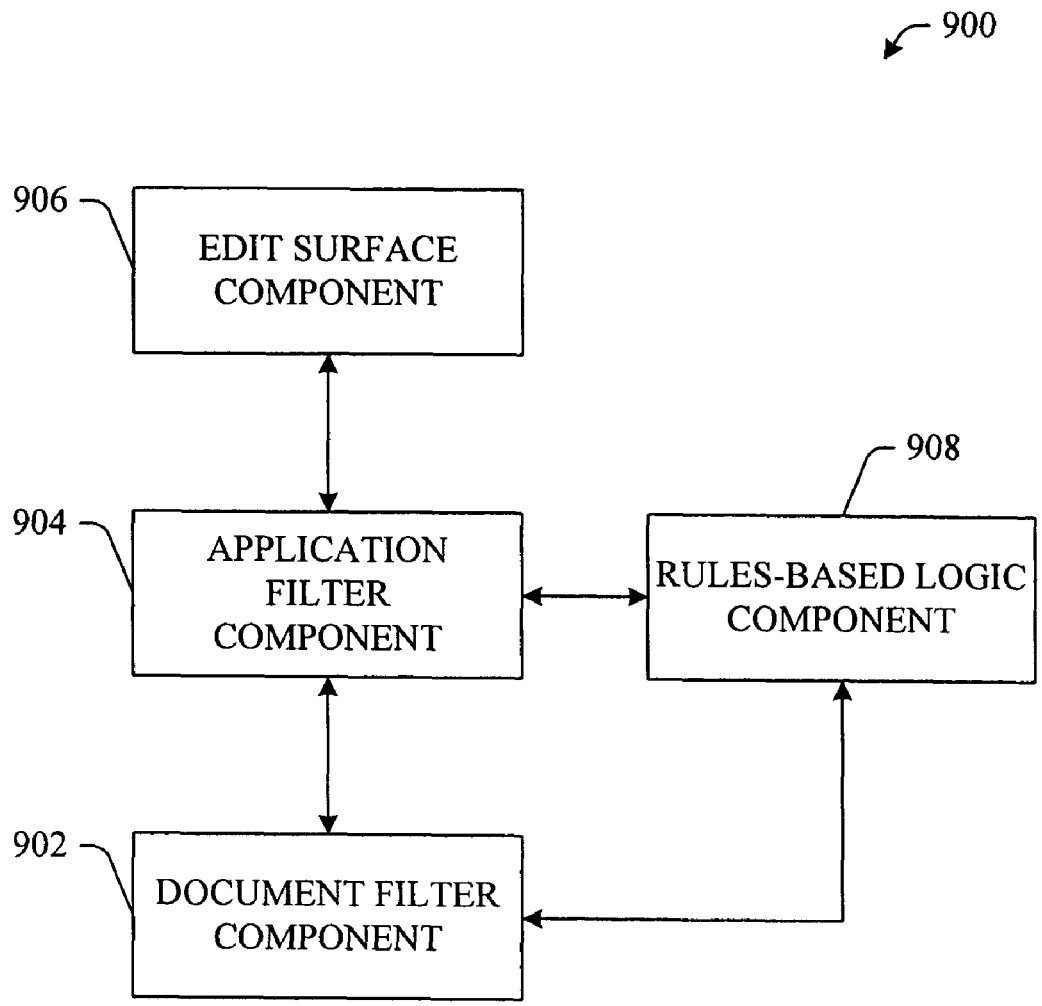
FIG. 9 illustrates an architecture including a rules-based logic component that can automate functionality in accordance with a defined rule in an aspect of the invention.

With reference now to FIG. 9, an alternate aspect of a system (e.g., 900) is shown. Generally, system 900 can include a document filter component 902, an application filter component 904, an edit surface component 906 and a rules-based logic component 908. In accordance with this alternate aspect, an implementation scheme (e.g., rule) can be applied to monitor and/or track changes to a document. It will be appreciated that the rules-based implementation can automatically and/or dynamically regulate the tracking and application of changes based upon a predefined criterion. In response thereto, the rule-based implementation can apply specified modification by employing a predefined and/or programmed rule(s) based upon any desired criteria (e.g., data type, data size, data importance, database owner . . . ). It is to be appreciated that any preference can be effected via predefined or pre-programmed in the form of a rule. The rules-based logic described with reference to FIG. 9 can be employed in addition to or in place of artificial intelligence (AI) based components described with reference to FIG. 10 that follows.

Figure 10:
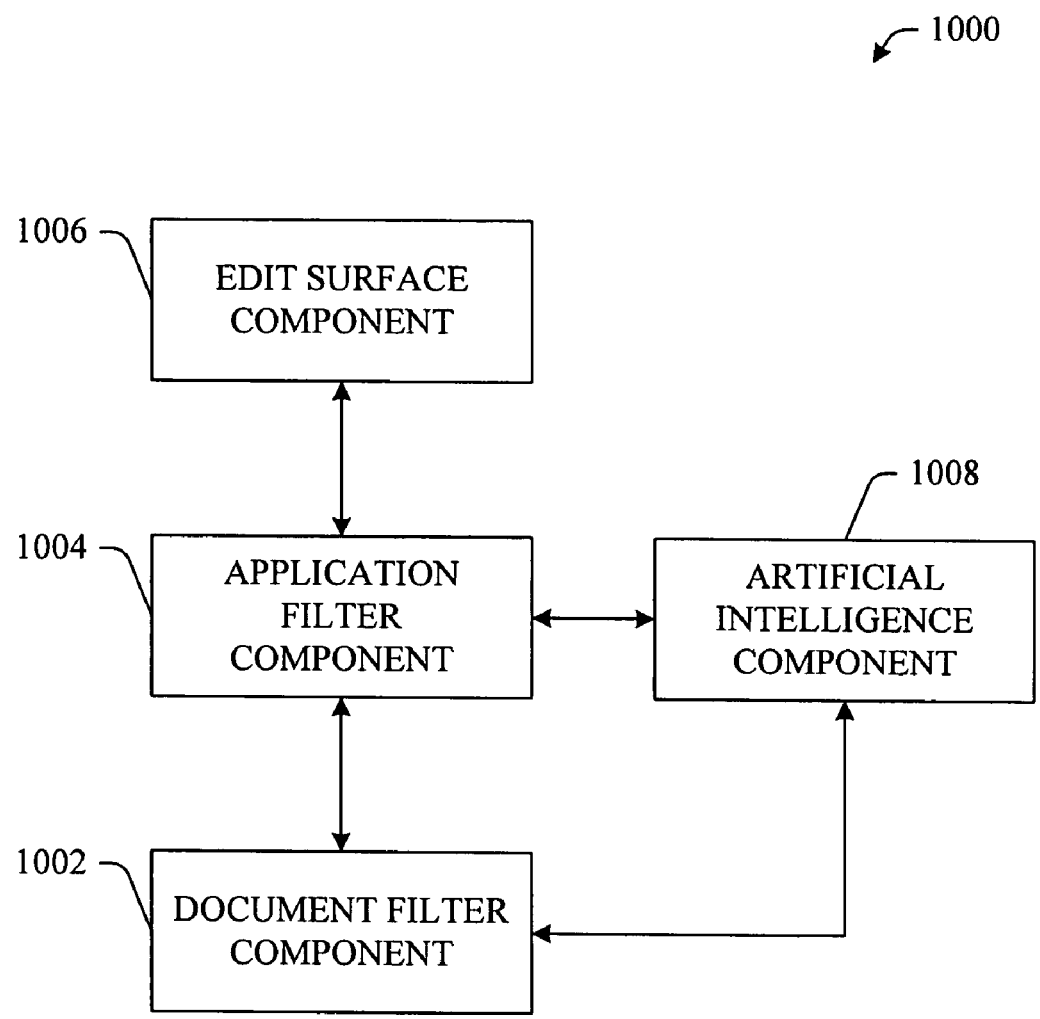
FIG. 10 illustrates an architecture including an artificial intelligence-based component that can automate functionality in accordance with an aspect of the invention.

FIG. 10 illustrates a system 1000 that employs AI-based reasoning which facilitates automating one or more features in accordance with the subject invention. System 1000 can include a document filter component 1002, an application filter component 1004, an edit surface component 1006 and an AI component 1008.

The subject invention (e.g., in connection with monitoring, tracking and/or applying changes can employ various AI-based schemes for carrying out various aspects thereof. For example, a process for determining when a file will be updated with respect to changes made via a text editor can be facilitated via an automatic classifier system and process.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. In the case of text editors, for example, attributes can be words or phrases or other data-specific attributes derived from the words or phrases, and the classes can be categories or areas of interest.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naive Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria when a document should be update or when changes should be tracked. This criteria can include, but is not limited to, the amount of memory on a device, device type, the amount of data to be mapped, the type of data, and the importance of the data.

Figure 11:
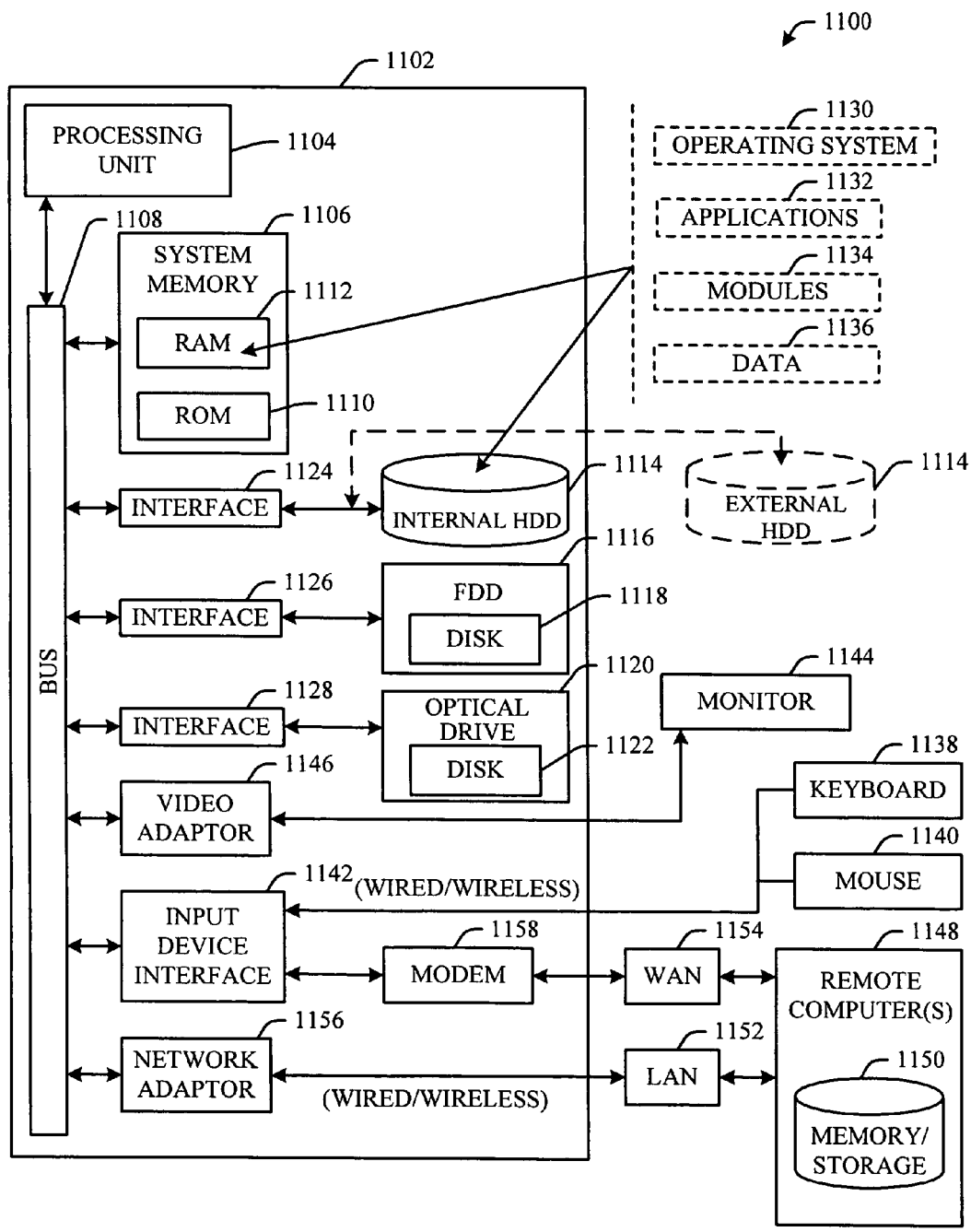
FIG. 11 illustrates a block diagram of a computer operable to execute the disclosed architecture.

Referring now to FIG. 11, there is illustrated a block diagram of a computer operable to execute the disclosed architecture. In order to provide additional context for various aspects of the subject invention, FIG. 11 and the following discussion are intended to provide a brief, general description of a suitable computing environment 1100 in which the various aspects of the invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 11, the exemplary environment 1100 for implementing various aspects of the invention includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures may also be employed as the processing unit 1104.

The system bus 1108 can be any of several types of bus structure that may further interconnect to a memory bus (with or without a memory controller), a peripheral bus, and a local bus using any of a variety of commercially available bus architectures. The system memory 1106 includes read-only memory (ROM) 1110 and random access memory (RAM) 1112. A basic input/output system (BIOS) is stored in a non-volatile memory 1110 such as ROM, EPROM, EEPROM, which BIOS contains the basic routines that help to transfer information between elements within the computer 1102, such as during start-up. The RAM 1112 can also include a high-speed RAM such as static RAM for caching data.

The computer 1102 further includes an internal hard disk drive (HDD) 1114 (e.g., EIDE, SATA), which internal hard disk drive 1114 may also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE 1394 interface technologies. Other external drive connection technologies are within contemplation of the subject invention.

The drives and their associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the invention.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is appreciated that the invention can be implemented with various commercially available operating systems or combinations of operating systems.

A user can enter commands and information into the computer 1102 through one or more wired/wireless input devices, e.g., a keyboard 1138 and a pointing device, such as a mouse 1140. Other input devices (not shown) may include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE 1394 serial port, a game port, a USB port, an IR interface, etc.

A monitor 1144 or other type of display device is also connected to the system bus 1108 via an interface, such as a video adapter 1146. In addition to the monitor 1144, a computer typically includes other peripheral output devices (not shown), such as speakers, printers, etc.

The computer 1102 may operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which may connect to a global communications network, e.g., the Internet.

When used in a LAN networking environment, the computer 1102 is connected to the local network 1152 through a wired and/or wireless communication network interface or adapter 1156. The adaptor 1156 may facilitate wired or wireless communication to the LAN 1152, which may also include a wireless access point disposed thereon for communicating with the wireless adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 via the serial port interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 12:
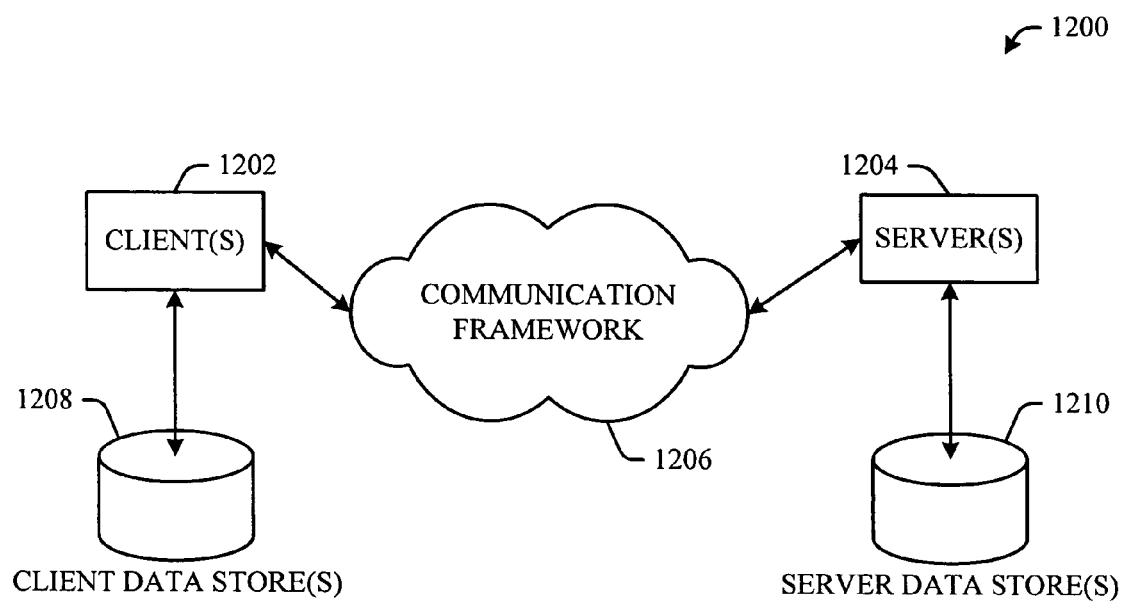
FIG. 12 illustrates a schematic block diagram of an exemplary computing environment in accordance with the subject invention.

Referring now to FIG. 12, there is illustrated a schematic block diagram of an exemplary computing environment 1200 in accordance with the subject invention. The system 1200 includes one or more client(s) 1202. The client(s) 1202 can be hardware and/or software (e.g., threads, processes, computing devices). The client(s) 1202 can house cookie(s) and/or associated contextual information by employing the invention, for example.

The system 1200 also includes one or more server(s) 1204. The server(s) 1204 can also be hardware and/or software (e.g., threads, processes, computing devices). The servers 1204 can house threads to perform transformations by employing the invention, for example. One possible communication between a client 1202 and a server 1204 can be in the form of a data packet adapted to be transmitted between two or more computer processes. The data packet may include a cookie and/or associated contextual information, for example. The system 1200 includes a communication framework 1206 (e.g., a global communication network such as the Internet) that can be employed to facilitate communications between the client(s) 1202 and the server(s) 1204.

Communications can be facilitated via a wired (including optical fiber) and/or wireless technology. The client(s) 1202 are operatively connected to one or more client data store(s) 1208 that can be employed to store information local to the client(s) 1202 (e.g., cookie(s) and/or associated contextual information). Similarly, the server(s) 1204 are operatively connected to one or more server data store(s) 1210 that can be employed to store information local to the servers 1204.

What has been described above includes examples of the invention. It is, of course, not possible to describe every conceivable combination of components or methodologies for purposes of describing the subject invention, but one of ordinary skill in the art may recognize that many farther combinations and permutations of the invention are possible. Accordingly, the invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates editing a rich formatted source document on a device having limited memory, the system comprising:
an edit engine that receives an indication to apply a rich edit modification to a user selected portion of the rich formatted source document, the selected portion comprising less than an entirety of the rich formatted source document, the rich edit modification comprising a plurality of user operations performed on the selected portion;
an interval mechanism that loads an impoverished rich text representation of the selected portion into a virtual file space in the memory and creates an interval within the virtual file space that tracks the plurality of user operations applied to the impoverished representation;
an inference engine configured to:
infer, based upon rich formatting characteristics of an environment of the rich formatted source document, rich formatting of the rich edit modification for application within the rich formatted source document; and infer, based upon the plurality of user operations performed on the selected portion within the virtual file space, a respective change location within the rich formatted source document for application of the rich edit modification; and an application filter that reorders the plurality of user operations and merges the rich edit modification with the rich formatted source document in accordance with the inferred rich formatting and the inferred change location.

2. The system of claim 1, wherein the inference engine further comprises a document filter that generates a stream of data that corresponds to the interval.

3. The system of claim 1, wherein the application filter classifies each of the plurality of user operations as an insertion, a deletion, or a zero-net-length change modification.

4. The system of claim 3, wherein the application filter reorders the plurality of user operations based at least in part on their respective classifications and generates a current interval that represents a reordered rich edit modification.

5. The system of claim 4, wherein the current interval is generated based at least in part on a parent interval that corresponds to at least one previously tracked modification.

6. The system of claim 4, wherein the inference engine further comprises a document filter that produces at least one stream of data that represents a portion of the current interval.

7. The system of claim 6, wherein the document filter produces the at least one stream of data based at least in part on the classification.

8. The system of claim 1, wherein the document is at least one of a word processor document, a spreadsheet document, or a database document.

9. The system of claim 1, further comprising an artificial intelligence (AI) component that infers an action that a user desires to be automatically performed.

10. The system of claim 1, further comprising a rules-based logic component that executes a rule to automatically perform a predefined user action.

11. A portable device that employs the system of claim 1.

12. A computer-implemented method of applying a plurality of rich edits performed on a device with limited memory to a rich formatted source document, the method comprising:
   loading impoverished rich text representations of user selected portions of the rich formatted source document to which the plurality of rich edits are to be applied into respective virtual file spaces in the memory via an interval mechanism, the selected portions comprising less than an entirety of the rich formatted source document;
   tracking the plurality of rich edits via the interval mechanism, each of the plurality of rich edits comprising one or more user operations performed on at least one of the selected portions within the respective virtual files spaces;
   inferring, based upon rich formatting characteristics of an environment of the rich formatted source document, respective formatting of the plurality of rich edits for application within the rich formatted source document;
   inferring, based upon the tracked one or more user operations, respective change locations within the rich formatted source document for application of the plurality of rich edits;
   reordering the plurality of rich edits within the respective virtual file spaces; and
   applying the plurality of rich edits to the rich formatted source document in accordance with the respective inferred formatting and the respective inferred change locations.

13. The computer-implemented method of claim 12, further comprising classifying the plurality of rich edits into at least one of insertions, deletions, or zero-net-length changes.

14. The computer-implemented method of claim 13, further comprising
   generating an interval based at least in part on the classified plurality of rich edits.

15. The computer-implemented method of claim 14, further comprising inferring a rendition of the document based at least in part on the interval.

16. A computer-readable storage medium having stored thereon computer-executable instructions for carrying out the method of claim 12.

17. A system that facilitates editing a rich formatted source document on a device having limited memory, the system comprising:
   at least one interval that comprises an impoverished rich text representation of a user selected portion of the rich formatted source document, the user selected portion comprising less than an entirety of the rich formatted source document, the at least one interval loaded into a virtual file space within the memory and configured to track changes made to the impoverished representation via the at least one interval; and
   an inference engine configured to:
      infer, based upon rich formatting characteristics of an environment of the rich formatted source document, rich formatting of the changes for application within the rich formatted source document;
      infer, based upon the tracked changes made within the virtual file space, a respective change location within the rich formatted source document for application of the tracked changes; and
      aggregate the tracked changes within the at least one interval to facilitate creation of a document order change list related to applying the changes within the rich formatted source document,
   wherein when a plurality of intervals comprise impoverished rich text representations of respective user selected portions of the rich formatted source document, the document order change list for the at least one interval is merged with document order change lists for the plurality of intervals to facilitate spatial updating of the rich formatted source document.

* * * * *